(12) United States Patent
Schwalb

(10) Patent No.: US 7,649,908 B2
(45) Date of Patent: Jan. 19, 2010

(54) CONVEYING TRANSACTIONAL MESSAGES FOR GSM MOBILE OPERATORS OVER TWO DISPARATE NETWORKS

(75) Inventor: Thomas Schwalb, Montreal (CA)

(73) Assignee: ITXC IP Holdings S.A.R.L., Luxembourg (LU)

( * ) Notice: Subject to any disclaimer, the term of this patent is extended or adjusted under 35 U.S.C. 154(b) by 609 days.

(21) Appl. No.: 10/749,003

(22) Filed: Dec. 30, 2003

(65) Prior Publication Data

US 2005/0141552 A1    Jun. 30, 2005

(51) Int. Cl.
*H04J 3/16* (2006.01)
(52) U.S. Cl. .............. 370/467; 370/401; 455/432.2
(58) Field of Classification Search ........... 370/401, 370/466, 467; 455/412.1, 412.2, 432.1, 432.2, 455/432.3, 433, 434, 435.1, 435.2, 435.3
See application file for complete search history.

(56) References Cited

U.S. PATENT DOCUMENTS

| | | | | |
|---|---|---|---|---|
| 5,867,788 A | * | 2/1999 | Joensuu | 455/433 |
| 5,890,064 A | * | 3/1999 | Widergen et al. | 455/445 |
| 5,933,784 A | * | 8/1999 | Gallagher et al. | 370/466 |
| 6,453,162 B1 | * | 9/2002 | Gentry | 455/432.3 |
| 6,615,041 B2 | * | 9/2003 | Adamany et al. | 455/433 |
| 6,625,461 B1 | * | 9/2003 | Bertacchi | 455/432.2 |

* cited by examiner

*Primary Examiner*—Ricky Ngo
*Assistant Examiner*—Pao Sinkantarakorn
(74) *Attorney, Agent, or Firm*—Kaplan Gilman & Pergament LLP

(57) ABSTRACT

A method and apparatus providing interconnectivity between several telephone networks. The apparatus receives a telephone transaction initiation message that originated with a telephone set located in a first network. The initiation message bears an originator's registration number identifying a subscriber whose home registration is located in a second network, the first and second networks using disparate signaling protocols. The apparatus then queries the originator's home registration database using the network protocol of the second network to determine the registration status of the originator. Finally, the registration status information is forwarded to the first network in the network protocol of the first network.

21 Claims, 14 Drawing Sheets

IRSC Components: Hardware, Firmware, and Software

IRSC Components: Hardware, Firmware, and Software

IRSC Preferred Network Configuration

Virtual Point Code Concept

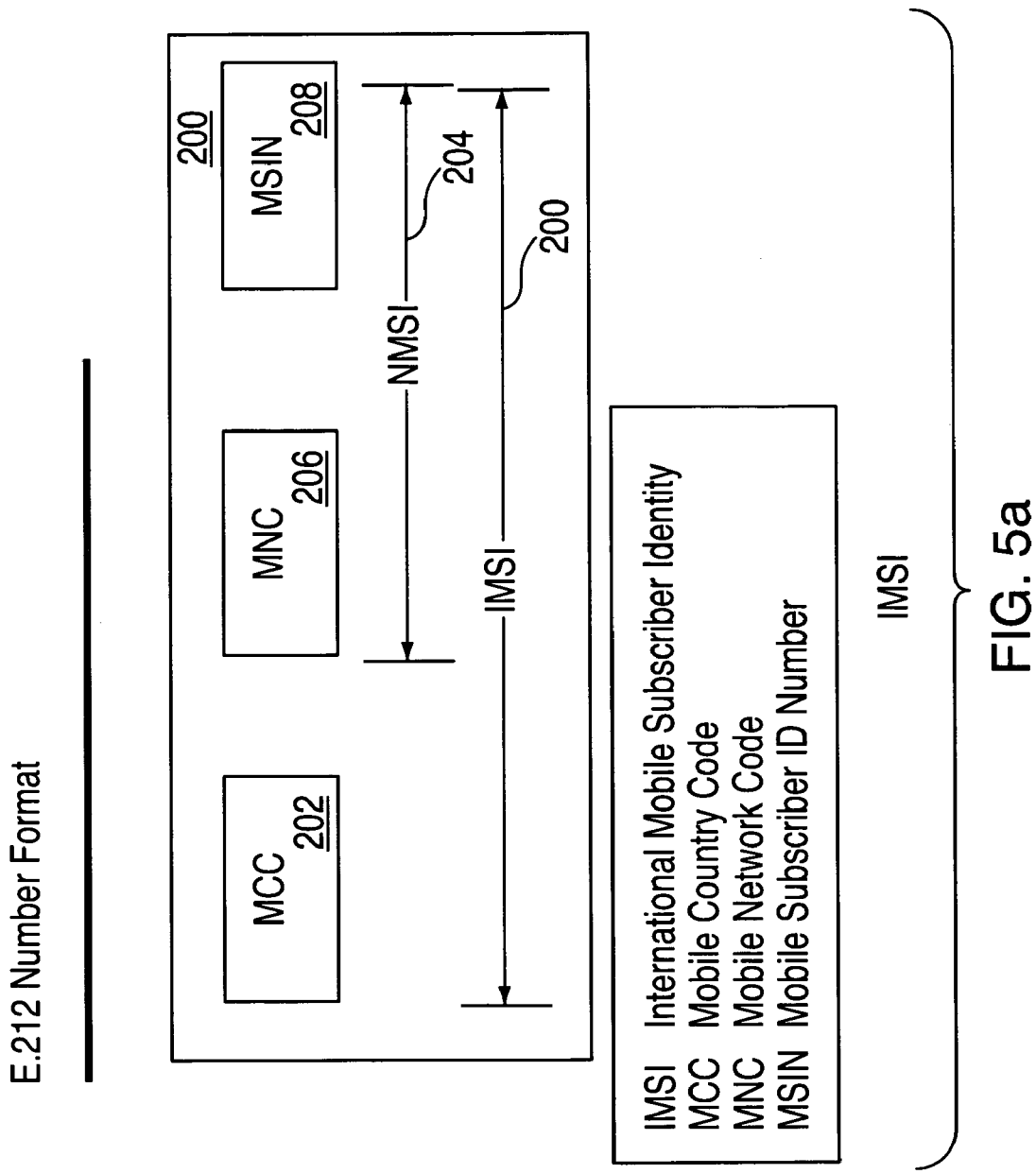

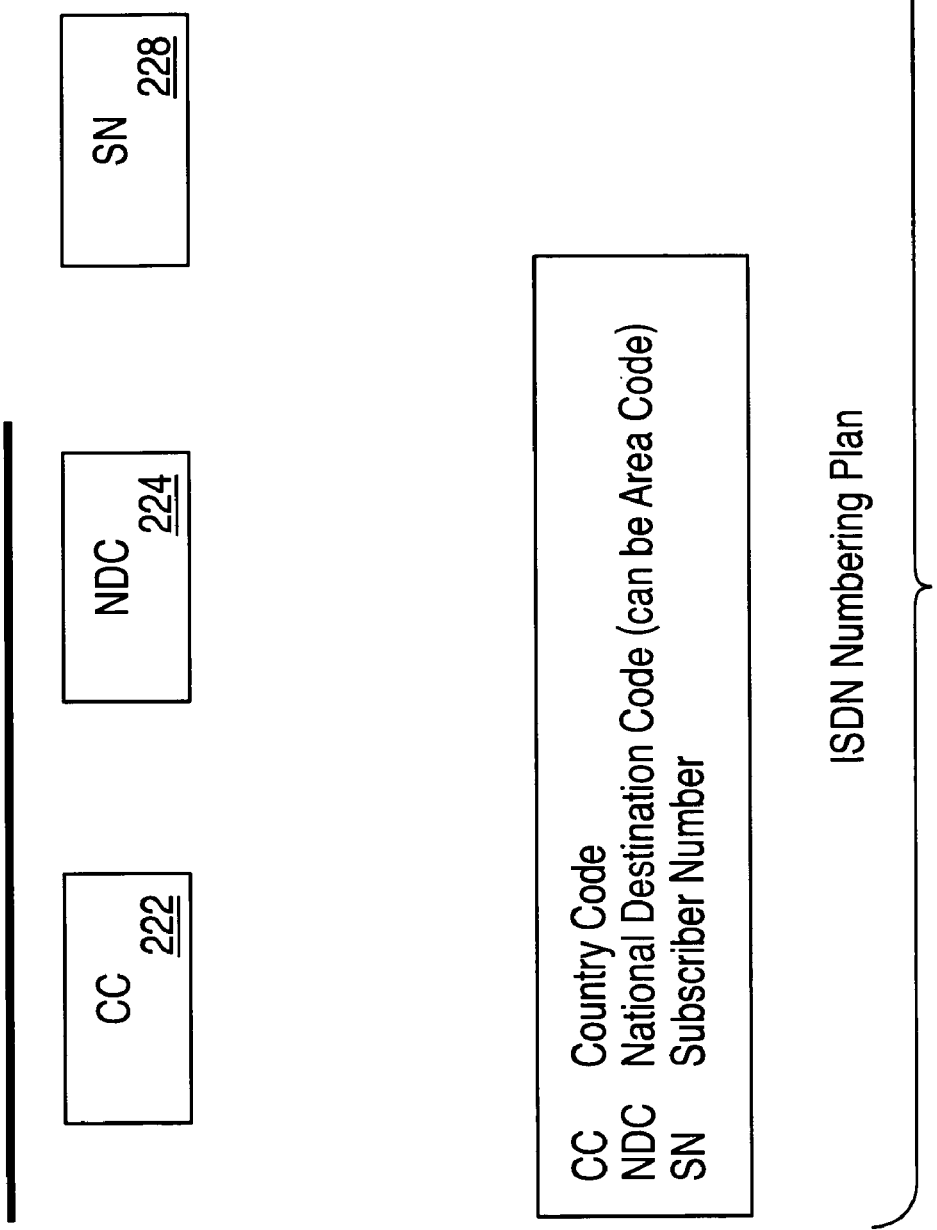

| Ref | Incoming number Plan Format | screening digits (key) | Outgoing number plan | Outgoing digits, replace incoming | Odd/Even Indicator | outgoing type | NOA outgoing called party | NOA outgoing calling party | Primary DPC | Secondary DPC | name of carrier |
|---|---|---|---|---|---|---|---|---|---|---|---|
| 1 | E214 | 191790 | E212 | 310160 |   | GTT | Natl | Natl | 211-255-255 | 211-255-250 | GSM 1 |
| 2 | E164 | 44385 | E164 | 44385 | 0 | GTT | Intl | Intl | 2-69-1 | 2-70-1 | GSM 2 |

Converter Database

FIG. 6

| Ref | Incoming number Plan Format | screening digits (key) | Outgoing number plan | Outgoing digits, replace incoming | Odd/Even Indicator | Outgoing routing type | NOA outgoing called party | NOA outgoing calling party | Primary DPC | Secondary DPC | name of carrier |
|---|---|---|---|---|---|---|---|---|---|---|---|
| 1 | E214 | 191790 | E212 | 310160 | | GTT | Natl | Natl | 211-255-255 | 211-255-250 | GSM 1 |
| 2 | E164 | 44385 | E164 | 44385 | 0 | GTT | Intl | Intl | 2-69-1 | 2-70-1 | GSM 2 |
| | E212 | 216555 | E214 | 33461 | | X | X | X | 2-255-2 | | Example |
| | | | | | | | | | | | |
| | | | | | | | | | | | |
| | | | | | | | | | | | |

Global Title Translation and Point Code Generation

FIG. 7

| Translation Type | 0 | 0 |
|---|---|---|
| Numbering Plan | 0111 (E.214) | 0001 (E.164) |
| Encoding Scheme | BCD Odd/Even | BCD Odd/Even |
| Nature Of Address Indicator | International | International |
| Address Information | GT Address Value | GT Address Value |

ITU Global Title Type Encoding

FIG. 8

| Translation Type | 9 (E.212) | 10 (E.164) |
|---|---|---|
| Address Information | GT Address Value (BCD)** | GT Address Value (BCD)** |

**Note that there is no Odd/Even indicator

ANSI Global Title Encoding

FIG. 9

| Originating Network | Terminating Network | Screen Result | Primary Point Code | Secondary Point Code |
|---|---|---|---|---|
|  |  |  |  |  |
|  |  |  |  |  |

Screening Table

FIG. 10

Routing Example

CONVEYING TRANSACTIONAL MESSAGES FOR GSM MOBILE OPERATORS OVER TWO DISPARATE NETWORKS

BACKGROUND

This invention relates to the method and apparatus for providing signaling interconnectivity between mobile telephone networks of different regions where the respective regions use disparate telecommunications standards and/or protocols.

Messages necessary for roaming, including authentication, registration, temporary assignment of roaming numbers to support calls to a roamer, and Short Message Service, among others, will utilize services of the described system.

"Signaling System 7" or "SS7" is a set of signaling protocol used by essentially all telephone equipment throughout the world. Around the world, there is general agreement on the lowest-layer protocols (called Message Transfer Part, MTP, and Signaling Connection Part (SCCP), and the higher-layer protocols (ISUP, TCAP and MAP).

However, there are two disparate standards for implementation of network signaling protocols in common use, ANSI and ITU. Outside the United States and Canada, including Europe and Asia, essentially all telephone end nodes and networks and interior nodes (e.g., mobile switching center, class 4 and 5 switches, etc.) use a signaling protocol agreed within the International Telecommunications Union (ITU). ITU protocols use an addressing scheme called "ISDN Numbering Plan (E.164), as well as mobile global title" (MGT) (E.214). Message packets in ITU systems represent caller and called party telephone numbers in a numbering plan format designated either "E.164" or E.214." In almost all cases, the address in an E.164 representation is the phone number as dialed for an international phone call. For example, an E.164 address of a U.S. telephone would be the country code "1," then the area code ("212" for New York City, or "416" for Toronto), and the seven-digit local phone number. In contrast, within the U.S. and Canada, network packets use number formats specified by the American National Standards Institute (ANSI). The addressing scheme used in ANSI is called "ISDN Numbering Plan (E.164), and international mobile station identity" (IMSI)(E.212). Called party numbers are represented in ANSI packets in a numbering plan format designated as "E.212" if they are destined to an HLR for certain messages, or E.164 if they are destined for the end subscriber unit, or certain nodes such as an MSC. Calling Party addresses are normally coded in E.164 format.

A hybrid numbering plan address format, designated "E.214" allows certain messages with E.212 format to be routed in ITU networks. In an E.214 address, the layout format for an address is a combination of E.164 and E.212. Essentially, the country and network information is formatted in E.164, while the unique customer identification within the network is formatted as E.212.

In SS7 network protocols, another level of addressing is provided by a "point code," a number that identifies a node, much as a zip code on a mailing envelope identifies the post office that serves a particular street address. Within North America, ANSI point codes are 24 bits long, allowing the specification of 16 million discrete destinations. The 24-bit ANSI point code generally uses the first 8 bits to identify a network, (Verizon, Cingular, T-Mobile, etc.), the second 8 bits to identify a cluster of nodes within the network and the last 8 bits to identify a node within the cluster. In ITU countries, an ITU point code is only 14 bits long, allowing the specification of 16,536 discrete locations. The 14 bit ITU point code generally uses the first 3 bits to identify a region, the next 8 bits to identify a network, and the last 3 bits to identify a node in that network.

Note that any end-point telephone in the world has a valid address in numbering plan E.164. GSM mobile units are also uniquely identified by an E.212 number. However, an interior node of the ANSI network essentially never has an ITU point code, and vice-versa.

Further details of ANSI and ITU protocols are discussed in section II.A, below.

A mobile telephone handset must use the air interface and protocols of the local base stations in whatever geographic region it is to be used. Thus, some mobile handsets are equipped with circuitry that allows the handset to switch between the different sets of air protocols.

Even where a mobile phone can be switched to use correct local protocol, a local mobile switching center cannot service that phone until the mobile switching center confirms the identity of a mobile subscriber. The mobile switching center can only confirm that identity if it can reach the "home location register" database for that phone. Where the mobile switching center uses one communications protocol and the computer storing the registration database uses another, this confirmation is impossible.

BRIEF SUMMARY

In general, in a first aspect, the invention features a method for providing interconnectivity between two mobile telephone networks that is accomplished by first receiving an originating telephone transaction message from a first network, the originating message having a first network messaging protocol and requesting subscriber information from a home registration database located on a second network, the first and second networks using disparate messaging protocols. The first network messaging protocol of the originating message is then converted into a second network messaging protocol and the converted originating message is forwarded to the home registration database of the second network. Next, a responding message is received from the second network, the responding message having the second network messaging protocol. Finally, the second network messaging protocol of the responding message is converted into the first network messaging protocol and the converted responding message is forwarded to an originator on the first network.

In general, in a second aspect, the invention features a method of providing interconnectivity between two mobile telephone networks, comprising the steps of receiving a message that originated with a telephone set or node located in a first network, the initiation message bearing an originator's registration number, or telephone number identifying a subscriber whose home registration is located in a second network, the first and second networks using disparate signaling protocols; querying the originator's home registration database using the network protocol of the second network to determine the registration status of the originator; forwarding registration status information to the first network in the network protocol of the first network.

In general, in a third aspect, the invention features an apparatus, comprising means for receiving a message that originated with a telephone set or node located in a first network, the message bearing an originator's registration number identifying a subscriber whose home registration is located in a second network, the first and second networks using disparate signaling protocols; means for querying the originator's home registration database using the network protocol of the second network to determine the registration status of the originator; and means for forwarding registration status information to the first network in the network protocol of the first network.

In general, in a fourth aspect, the invention features a method for conveying transactional messages including receiving an originating telephone transaction message from a first network, the originating message having a first network messaging protocol and having a first virtual point code as its destination point code; converting the first network messaging protocol of the originating message into a second network messaging protocol; forwarding the converted originating message to a home registration database of the second network; receiving a responding message from the second network, the responding message having the second network messaging protocol and having a second virtual point code as its destination point code; converting the second network messaging protocol of the responding message into the first network messaging protocol; and forwarding the converted responding message to an originator on the first network.

In general, in a fifth aspect, the invention features an apparatus having a means for receiving an originating telephone transaction message from a first network, the originating message having a first network messaging protocol and having a first virtual point code as its destination point code; a means for converting the first network messaging protocol of the originating message into a second network messaging protocol; a means for forwarding the converted originating message to a home registration database of the second network; a means for receiving a responding message from the second network, the responding message having the second network messaging protocol and having a second virtual point code as its destination point code; a means for converting the second network messaging protocol of the responding message into the first network messaging protocol; and a means for forwarding the converted responding message to an originator on the first network.

Embodiments of the invention may include one or more of the following features. Converting the first network messaging protocol may be accomplished by deriving a destination point code. Similarly, conversion of the second network messaging protocol may be accomplished by deriving the destination point code. Converting the first network messaging protocol may also be accomplished by converting a format of an originator's address. Similarly, conversion of the second network messaging protocol may also be accomplished by converting a format of an originator's address. Converting the first network messaging protocol may be also accomplished converting a format of a destination address. Similarly, conversion of the second network messaging protocol may also be accomplished by converting a format of a destination address.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 5a is a schematic diagram of the format of the international mobile station identity (IMSI) address, as defined in ITU Recommendation E.212.

FIG. 5c is a schematic diagram of the format of the ISDN Numbering Plan as defined in ITU (and ANSI) Recommendation E.164.

FIG. 6 shows the composition of a typical mapping and translation table.

FIG. 7 is an example of a typical database table implementation showing the Global Title Translation function.

FIG. 8 is an example of a table utilized for ITU global title type encoding.

FIG. 9 is an example of a table utilized for ANSI global title encoding.

FIG. 10 is an example of a screening table.

DETAILED DESCRIPTION OF THE PREFERRED EMBODIMENTS AND THE DRAWINGS

I. Overview

Figure 3:
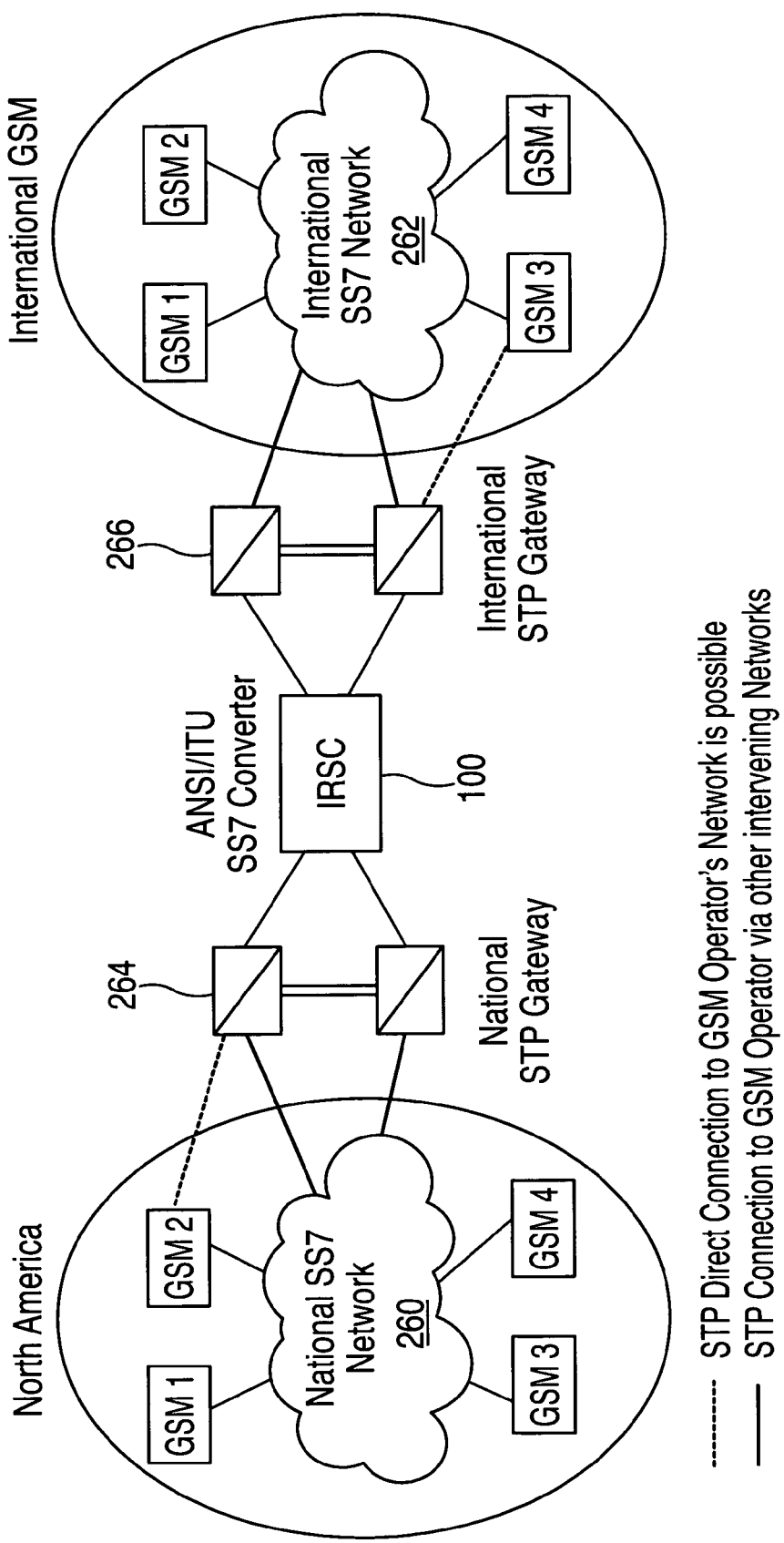
FIG. 3 is a schematic diagram showing a preferred network configuration for an IRSC.

Referring to FIG. 3, an International Roaming Signaling Converter (IRSC) 100 allows GSM mobile communication subscribers to make and receive calls from any location in the world using a single multi-mode phone and a single subscriber account, by interfacing the North American national and international networks. IRSC 100 allows an ITU subscriber (that is, a person subscribing to an ITU mobile service network outside of the North American ANSI network) to originate and receive calls when traveling in North America. Similarly, an ANSI subscriber (that is, a telephone whose subscription is registered to a cellular provider in North America) is allowed to originate and receive phone calls when traveling in an ITU country. Messaging between two mobile networks is required to exchange information on roaming subscribers, and to pass Short Message Service (SMS) packets from one subscriber to another. These messages are transported on the Signaling System 7 network. IRSC 100 interfaces between the two regions of the network that use the two different protocol families. When a telephone that is roaming into a "foreign" territory originates or causes a node to originate a message, packets of the protocol may be routed through IRSC 100. IRSC 100 may translate the information in packets into the form and content required by the destination network. IRSC 100 may obtain the registration information from the telephone's home location register database (HLR) (see section II.B) and translate that information into the form demanded by the mobile switching center to which the handset has roamed. For example, if a North American subscriber desires access in a European network, IRSC 100 translates the subscriber's serving MSC-originated ITU Mobile Global Title (MGT) address into an ANSI/IMSI address, and also converts the message into ANSI format so that the European ITU equipment can access the subscriber's home location register in the ANSI network. This conversion also allows the response from the HLR to forward the roaming signal through the European network.

These features of IRSC 100 may provide transparent communications for a roaming telephone device, such that each node in each of the two portions of the network 260, 262 believes that the call is traversing a network that uses the communications protocol native to that portion. The entire burden of the interfacing translation may be borne by IRSC 100 node, so that roaming service can be provided to mobile sets of foreign protocols, with only routing table modification of signaling nodes in either half of the network being required. IRSC 100 may provide sufficient information to the ITU network so that it can provide mobile services to an ANSI handset as if it were a European handset, or vice-versa.

Several protocol conversions are performed by IRSC 100. The North American Network uses an ANSI message protocol and IMSI global title address (ANSI/IMSI message format), and the foreign network uses an ITU message protocol and a Mobile Global Title (MGT) global title address (ITU/MGT message format). In addition, the networks may use different frequencies and/or coding, compression or modulation techniques, but these elements are not part of the invention, and are handled by the dual or multiple mode handsets. IRSC 100 may act as an interface between the two networks translating the ANSI/IMSI message format into the ITU/MGT message format, and visa versa.

As will be discussed further in section III, below, redundancy for reliability may be provided by providing multiple IRSC nodes 100, 102, with corresponding multiple links and associated hardware. These multiple IRSC's 100, 102 may be deployed in a load sharing configuration so that failure in any IRSC unit will automatically redistribute the traffic to the other IRSC units with reduced or no service disruption.

II. IRSC Configuration

Figure 2:
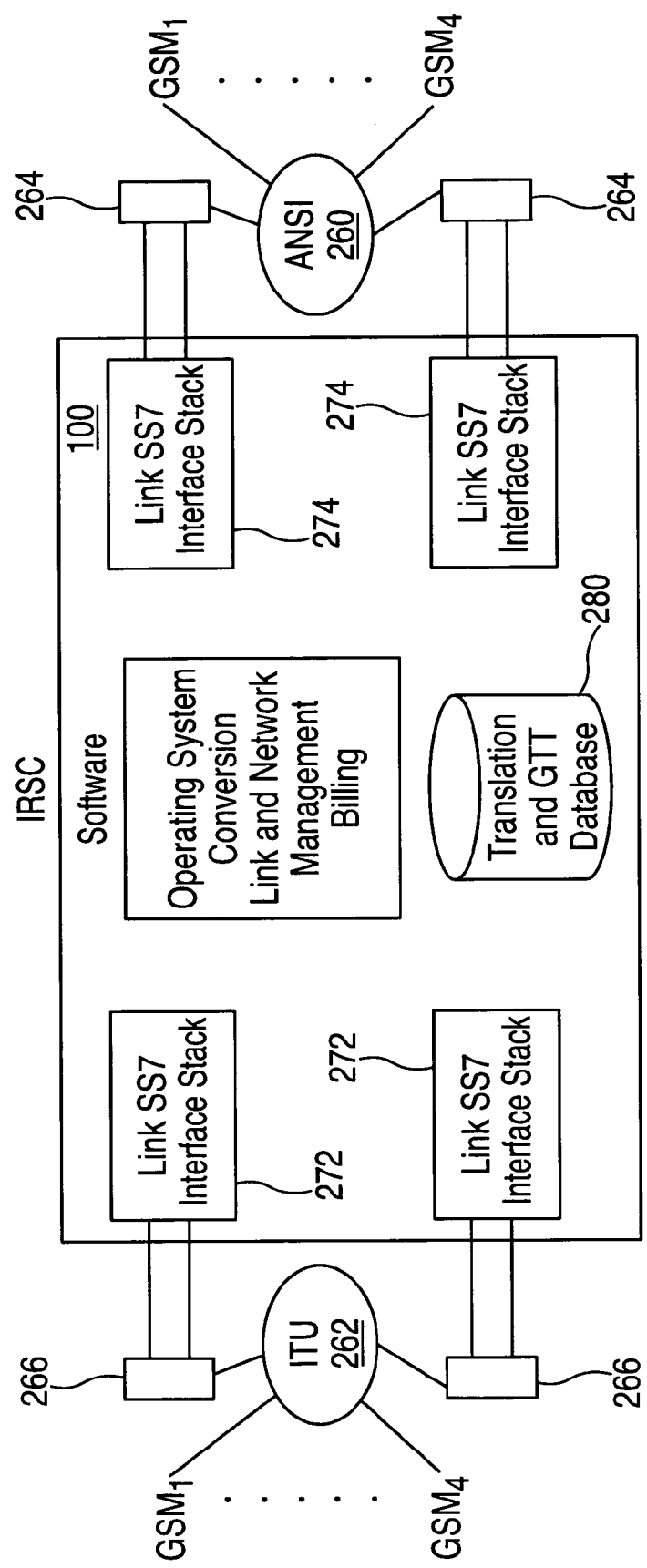
FIG. 2 is a schematic diagram showing components of the International Roaming Signaling Converter ("IRSC") in accordance with the present invention.

As shown in FIG. 2, IRSC 100 may include signaling link interfaces 272, 274, Signaling System 7 Stacks in both ANSI and ITU versions, conversion software, a central database 280 and associated software, signaling link and network management, and an operating system. A well-designed IRSC is designed to interface transparently to unmodified ANSI and ITU mobile and non-mobile network equipment and protocols, imposing no requirements for change on these pre-existing components that are widely deployed.

II.A. ITU and ANSI Signaling Protocols

Each packet of a transmission carries two addresses, the identifying numbers of the destination party and of the sender party. For example, during call initiation, the sender party will be the caller who originates the call, and the destination party will be the called party. In the case of roaming messages, the initiator of the message is identified by the Calling Party address, while the destination node is identified by the Called Party Address. ANSI and ITU telephone systems use different formats for their packets, store these phone numbers differently within their packets, and assign different meanings to various portions of the phone number addresses, and other parameters.

Referring to FIG. 5*a*, an IMSI address 200 used in ANSI networks includes a Mobile Country Code (MCC) 202 and National Mobile Station Identity (NMSI) 204. MCC 202 consists of three decimal digits, and uniquely identifies the country of the subscriber's home network. The two parts comprising the NMSI 204 are the Mobile Network Code (MNC) 206 and the Mobile Station Identification Number (MSIN) 208. The MNC 206 is a combination of digits that uniquely identifies the subscriber's home network within a country (or in some cases, within the MCC). For example, each different carrier in Italy is assigned a unique MNC value. The MSIN 208 is a series of digits that uniquely identifies the subscriber, and possibly, as well as the location of the subscriber's home location register (see section II.B) within the subscriber's home network.

Figure 5B:
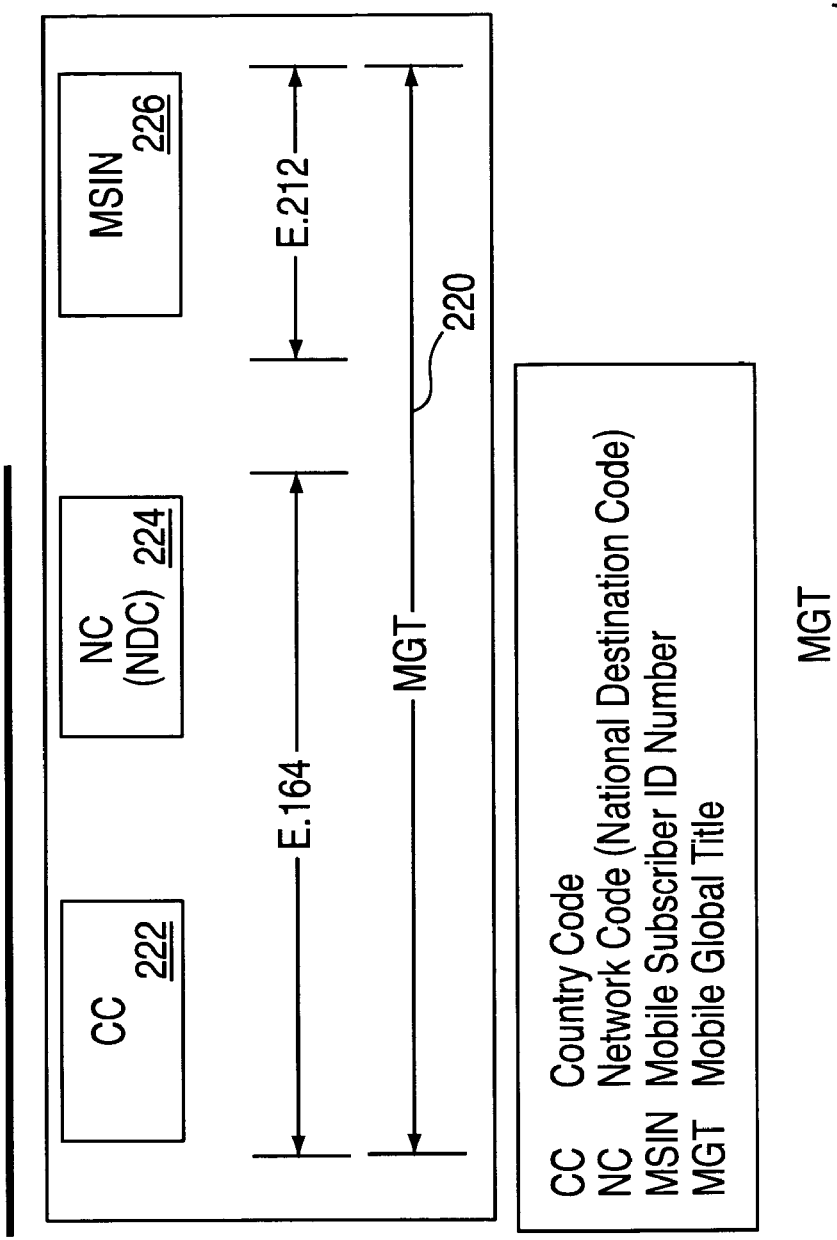
FIG. 5b is a schematic diagram of the format of the mobile global title (MGT) address, as defined in ITU Recommendation E.214.

Referring to FIG. 5*b*, a mobile global title (MGT) address 220, associated with ITU networks, is both formatted differently from an IMSI address and contains substantively different information. The MGT address 220 is of variable length and composed of decimal digits arranged in two specific parts, identified by ITU Recommendations E.164 and E.212. FIG. 5*c* shows the contents of the ISDN Numbering Plan as defined in Recommendation E.164. A typical E.164 number format includes a country code 222, a national destination code 224 and a subscriber number 228. Thus, the E.164 portion of the MGT address 220 comprises the country code 222 and the network code (i.e., the national destination code) 224. Further, the E.164 portion is used to identify the country and network associated with the subscriber's home location register. The E.212 part is composed of the mobile station identification number (MSIN) 226, as defined in ITU Recommendation E.212, and is used to uniquely identify the subscriber, and possibly, as well as the location of the subscriber's home location register (see section II.B) within the subscriber's home network.

MGT addresses 220 are analogous to classical U.S. land line number assignments: the country code 222, and network code 224 are almost purely geographical. In contrast, IMSI addresses 200 are more analogous to overlaid area codes (e.g., 212, 917 and 646 for Manhattan): MNC 206 identifies the carrier network of the subscriber (e.g., the GSM mobile Operating Company, independent of geography.

II.B. The Home Location Register

Figure 1:
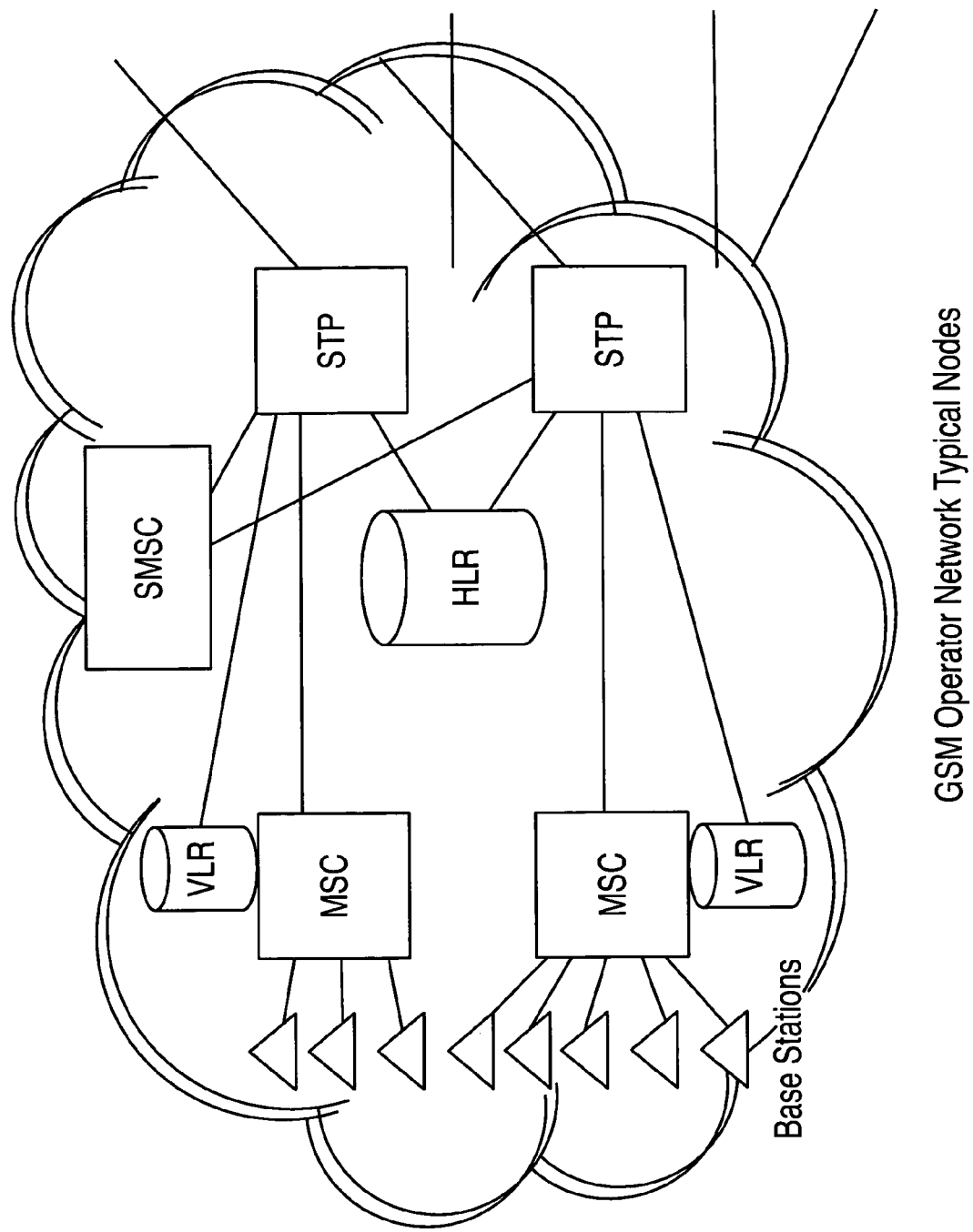
FIG. 1 is a schematic diagram showing a configuration of a typical GSM mobile service provider's network.

As shown in FIG. 1, each carrier maintains a database of all its subscribers, called a "home location register" (HLR). Each subscriber's record in his carrier's home location register contains the authentication, servicing and billing information necessary to serve the subscriber in his home or in the foreign network. Mobile phones are typically equipped with a SIM (Subscriber Identification Module) card that contains information that uniquely identifies the subscriber, typically including the subscriber's IMSI, system password, and other parameters. However, authorized services and billing information are not typically included on the personalized card, because it is more practical to keep this information in a database under the control of the carrier, the home location register (HLR), rather than a memory that is under the physical custody of the subscriber (the SIM card). Thus, a SIM card specifies the location of the subscriber's HLR. When the subscriber activates the phone, the network issues a query to the subscriber's HLR to ensure that the registration is authorized, download subscriber information to the MSC/VLR, and to update the HLR of the subscriber's current location.

II.C. IRSC Hardware

Referring FIGS. 2 and 3, IRSC 100 serves as the interconnection point between two or more disparate networks 260, 262. IRSC 100 can be a stand-alone node. Alternatively, IRSC 100 may be co-located with a mobile switching center (MSC) either in North America or an ITU country, or co-located with a gateway Signal Transfer Point (STP). In some cases, one side or the other of IRSC 100 may be interfaced to the ANSI network 260 and the ITU network 262 through respective STP's 264, 266. IRSC 100 may be special purpose hardware, or general-purpose computer hardware, for example, a Power PC with Compact PCI bus.

II.D. IRSC Interconnections to Communications Networks

IRSC 100 node may have connections to nodes of each of the networks 260, 262 between which IRSC 100 is to intermediate. For example, IRSC 100 node might be located in Montreal or Toronto Canada. One or more lines connecting IRSC 100 to Europe and Asia may use ITU protocols to connect to ITU network 262 through one or more ITU STP's 266, and one or more lines connecting IRSC 100 to the North American ANSI network 260 through one or more ANSI STP's 264 may use ANSI protocols.

IRSC 100 has both an ANSI Point Code network address and an ITU Point code network address and, thus, appears to be an ANSI network node to other North American ANSI networks, and simultaneously appears to be an ITU network node to other ITU networks.

In order to be accessed by equipment in ANSI network 260, IRSC 100 may have a point code 268 in the 24-bit ANSI point code space, and a separate point code 270 in the 14-bit ITU point-code space. As will be discussed further in section III, IRSC 100, 102 may have multiple point codes to provide redundancy and reliability.

IRSC 100 contains the necessary hardware and software to receive messages from either network and to transmit messages to either network. Signaling link interface 272, 274 may be capable of connecting and decoding the line signals in the corresponding protocol (ANSI or ITU) of SS7 facing the ANSI or ITU network. The SS7 stack further decodes the SS7 messages and differentiates the various layers (Message Transfer Part (MTP), Signaling Connection Part (SCCP), and higher layers (TCAP and MAP)) in either ANSI or ITU protocol. Some portions of the format conversion can be handled by hard-coded algorithms, as will be discussed further below. The signaling link and network management component monitors and controls the links and routes of the networks from IRSC 100 perspective, and interfaces to the respective functions at the remote nodes of ITU and ANSI networks.

II.E. IRSC Databases and Translation Software

Referring again to FIG. 2, IRSC 100 performs conversion of signals to/from ITU format and protocols from/to ANSI format and protocols. Typically, one, two, or three conversions and translations may be required: derivation of a point code, conversion of a calling party address, and conversion and translation of a called party address. A Destination Point Code is required to send the message in the other network, and the derivation of this point code is referred to as "global title translation." IRSC 100 may use one or more look-up tables of database 280 to perform these translations.

The converted information is expressed in the format that is native to the destination network. That is, when IRSC 100 converts a packet that is sent from the ITU network to the ANSI network, the converted information is expressed in ANSI form. Similarly, when IRSC 100 converts a packet that is sent from the ANSI network to the ITU network, the converted information is expressed in an ITU format.

In some cases, IRSC 100 may convert the caller and called party addresses of a packet from the form used in the network where the packet originated into the form used by the destination network, without further "looking inside" the packet to alter its contents. In other cases, to translate the Called Party Address parameter of an SCCP packet, IRSC 100 may "look inside" a packet and translate some of the contents of the packet from one addressing protocol to the other.

When an ITU subscriber is roaming in North America, as the phone is activated, the North American mobile switching center issues a query to the subscriber's home location register. The mobile switching center, being located in North America, naturally frames this query in ANSI format. When the query packet reaches IRSC 100, IRSC 100 converts the query from the ANSI protocol to the ITU protocol.

Before the conversion, the destination point code in the received query message is that of the IRSC. However, as explained above, the message is really destined for the ITU network. The IRSC uses the called number in the database to derive the ITU point code of the overseas HLR. This operation is called Global Title Translation. The IRSC's ITU virtual point code is inserted in the originating point code (OPC) field, which is, for example, 3-005-1. Thus, messages are converted from ANSI SS7 format to ITU SS7 format. Similarly, ANSI/IMSI addresses are translated to ITU/MGT addresses, and an ITU point code is derived by performing GTT.

Once a packet has been converted, it is forwarded through the destination network to its destination address.

The IRSC 100 allows the home and visited networks to exchange information as if they were of the same network protocol type. Once this authentication and location update is performed, the roamer can initiate and receive calls without the intervention of the IRSC (with the exception of the "provide roaming number" message). In particular, the mobile operator and the standard PSTN handle calls. The call may be routed directly from the mobile switching center to the destination in the other network, bypassing IRSC 100 during the duration of the call, leaving the translation of the call control messages to traditional gateway switches and STP's 264, 266.

The "provide roaming number" message does require to be converted and must be routed through IRSC 100. The following procedure may be implemented. If a call arrives at the subscriber's home MSC and the subscriber is roaming in another network, the MSC can query the associated HLR for the subscriber's current location in terms of a serving, or visited MSC. The home MSC then requests the visited MSC (through the IRSC if the access is such for ANSI/ITU conversion) for a temporary roaming number belonging to the visited MSC. Once the reply is received, the home MSC initiates a call through the PSTN to that MSC, where the call will be connected to the roaming subscriber.

Much of the logic of number conversion and Global Title Translation to derive a DPC is embodied in database 280 (FIG. 6). In one example, database 280 may have the following columns:

Database key: (These two entries are the keys into the table)

Received Number Plan (also known as "Received Nature of Address"): an indicator of whether the number to be translated is currently expressed in E.164, E.212, or E.214 numbering plan Received Number Value: the digits of the number to be translated. This value is typically received as the SCCP Called Party Address parameter. The digits may be listed as a single number, or the lower and upper bounds of a digit range. (these values are related to the Translation Type) [In ITU, the Translation Type (TT) is set to 0. In ANSI, TT is set to 9 for E.212, and 10 for E.164. However the software also supports other values as well, based on the destination network.

Remaining entries: used to derive the outgoing values and parameters in the corresponding message to be transmitted, once the key above is matched.

Transmitted Called Party national/international Indicator: indicates whether a Country Code is included in the Called Party address.

Transmitted Called Party Numbering Plan: indicates whether the Called Party address is in E.164, E.212, or E.214 format.

Transmitted Called Party number: the digits that are to replace those entered in the Received Number field, or an indicator of an algorithm to be used for the translation GTT Indicator: indicates to the next node addressed in the route, whether it has to perform another Global Title Translation to determine the DPC of the final destination of the message Insert Digits and Position Marker: This is used for advanced digit translation functions, whereby digits beyond those specified in the key are to be manipulated.

Odd/Even Indicator

This field controls the odd/even indicator of the Called Party Address for ITU messages.

Transmitted Calling Party National/International Indicator: indicates whether a country code is included in the number Primary Destination Point Code Type: This sets the value of the network indicator field of the message. It may be ITU, ANSI, or the equivalent Spare values. This value also triggers the conversion software. The received message field value is compared to this value to determine whether a conversion is necessary. (ITU to ITU does not require conversion, but ITU to ANSI or ANSI to ITU does require conversion of the message elements.

Primary Destination Point Code Value: This is the value to be inserted in the DPC field of the newly converted message. Given the Received Called Number key, this is the Global Title Translation result: the Destination Point Code of the message. The Primary DPC is used to route the message to the destination network.

Secondary Destination Point Code Type, Secondary Destination Point Code Value: This is similar to the Primary fields above, but it is only used when the route to the Primary DPC becomes unavailable due to network or other type of failure.

Operator ID: This is an internal, administrative field that can be used for operations where all information respecting a particular network operator needs to be collated. One example would be a billing functionality.

The database may also allow multiple functional steps in the interface process to be combined in a single access step.

III. Redundancy, Reliability and Virtual Point Codes

Two or more IRSC's 100, 102 may be configured to provide redundancy and load sharing for reliability and survivability purposes.

Because each node of an SS7 network must be assigned its own point code that is used to address that node, failure or inaccessibility of that node would cause all messages sent to or through that node to be lost. Known remedial methods for providing redundancy (such as secondary point codes and alias point codes for STP's) are not common across the various flavors of SS7 signaling.

In some cases, a pool of several IRSC's 100, 102 may be provided. Each IRSC may have its own respective ITU point code 268, 294 and ANSI point code 270, 296. In addition (or as an alternative), the pool may have a virtual ITU point code 290 and a virtual ANSI point code 292 distinct from (or instead of) the physical point codes of any particular IRSC 100, 102. With this method, interconnecting networks 260, 262 address the virtual point code 290, 292 to access IRSC 100. Traffic addressed to virtual point codes 290, 292 may be shared between the multiple IRSC's 100, 102. If one of IRSC's 100, 102 fails or becomes inaccessible, the automatic routing of the interconnecting network STP's 264, 266 may automatically and immediately reroute all of the traffic to the remaining IRSC's 100, 102. This may reduce any service disruption in the case of failure.

Figure 4A:
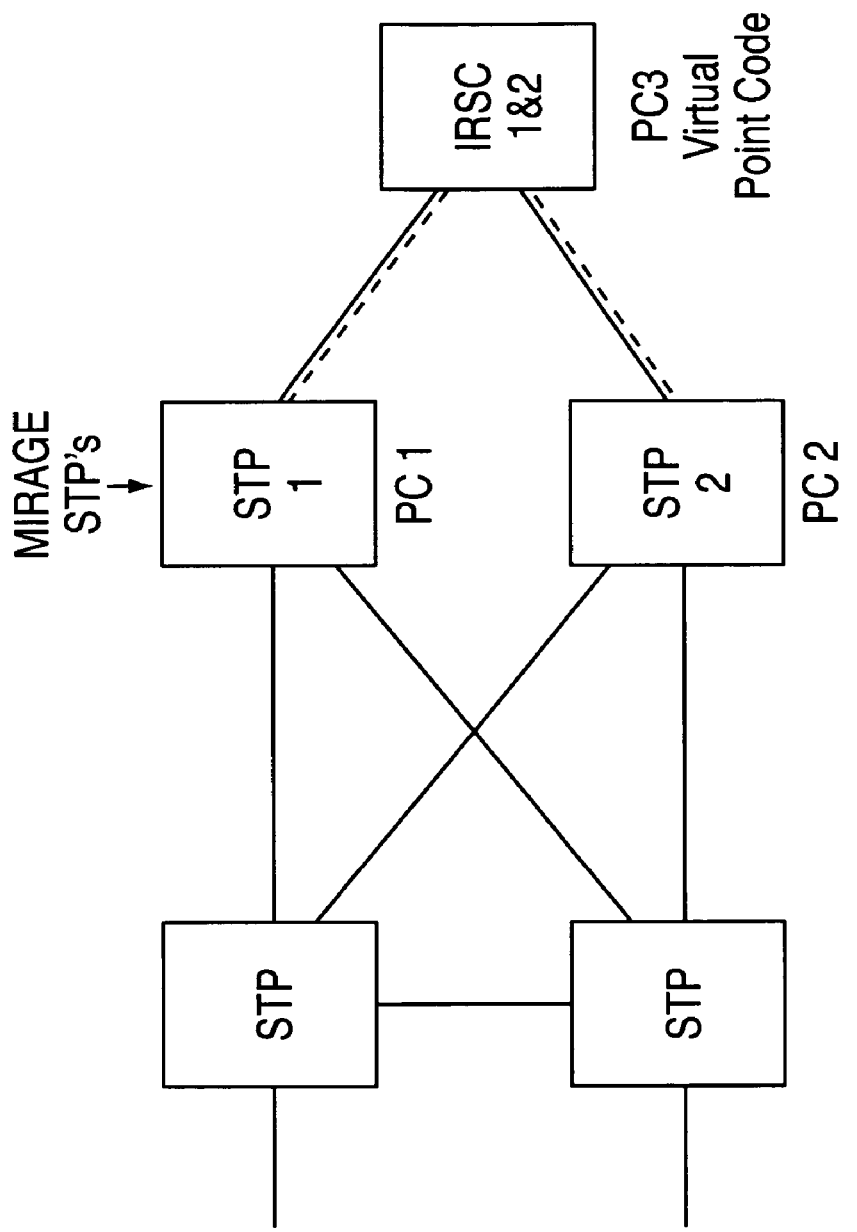
FIG. 4a is a schematic diagram illustrating the concept of utilizing Virtual Point Codes.
Figure 4B:
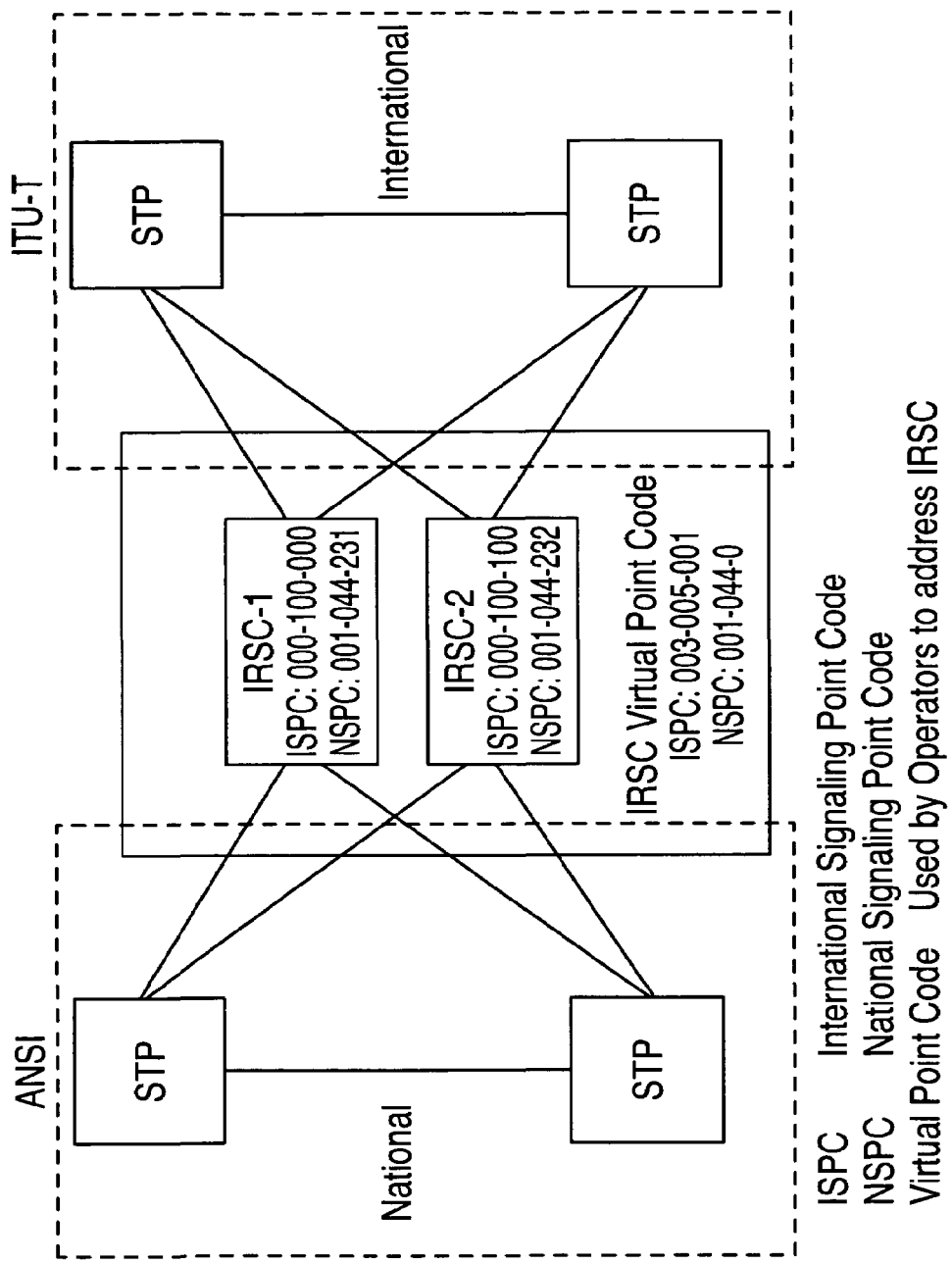
FIG. 4b is a schematic diagram further illustrating the concept of Virtual Point Codes as implemented with a typical IRSC system.

As shown in FIGS. 4*a* and 4*b*, each IRSC has its own point code. In FIG. 4*a*, these are PC1 and PC2 with the virtual point code of PC 3 is shared between them. (In reality there is no IRSC on the extreme right—they are in fact in what appears to be STP1 and STP2). The real STPs on the left think that the IRSCs are additional STPs that are themselves connected to an IRSC beyond. From the STP or network point of view, these are an additional pair of STPs, but in fact they are a mirage. This allows each STP to use either path through PC1 or PC2 to reach PC3. If either one of the PC1 or PC2 fails, the other will receive all of the traffic, without any loss of messages. The real configuration is shown in FIG. 4*b*. All messages to be converted (roaming and SMS) and originating at GSM operators address the Virtual Point Code. The Virtual Point Code shown in the figure is 003-005-001, for International Signaling Point Code (ISPC) and 001-044-0 for National Signaling Point Code (NSPC). The real point code is used only between the STPs and the IRSC for link and network management.

IV. Origin-Based Routing

This function is useful to provide enhanced routing capabilities. It is implemented using another table for origin-based routing and screening. The key into this table is both the originating and destination Mobile service provider ID. The key will then determine whether the message is to be routed as previously determined, or blocked, or rerouted to a new route with a new DPC. This function can be implemented by a Screening Table shown in FIG. 10. The fields in such a table could include Calling Party network, Called Party Network, Screening Result and Updated Primary and Secondary Point Code. Every message accesses this table and the corresponding entry for originating and terminating networks is indexed. The Screening result is one of three values: Block message, send message with original GTT (Destination Point Code), or update the original GTT with a new Primary and Secondary DPC. Blocking is used in the case that both the originating and terminating networks have been entered in the main translation/conversion database table, but no signaling (commercial) relation exists between the two operators in question. The messages would be routed as per the table entry, however the Screening table result could be marked as Block. In this case the message would be blocked. A routing result of Original would cause the message to be sent as specified by the conversion table. A routing result of Update, would modify the DPC of the message to that indicated in the Screening table.

V. Odd/Even Indication

This database field was deployed in order to overcome a problem between ANSI and ITU specifications. The Called Party Address in an ITU message contains an odd/even indicator to describe the length of the parameter (See FIG. 8). Each byte of the parameter contains two digits, and the last byte may contain one or two valid digits. If it is an odd value the indicator is set to odd, and the last digit of the byte is not valid. For GSM messages in ANSI format, there is no such indicator (See FIG. 9). It is assumed that the last digit, if invalid, would be coded as a hexadecimal F value. However ANSI GSM operators do not use this marker, and instead insert a zero. At the IRSC this 0 is indistinguishable from a valid 0, and therefore all digit lengths are set to even. While this worked for simple routing in the network, with the advent of Wireless Number Portability in the international arena, the database dip to resolve the portability requires the exact number. If the digit length is wrong (i.e., if there is an extra 0) this validation will fail. While it is impossible on the ANSI side to know from the message in real time whether the 0 is valid or not, this information can be extracted from GSM operator's numbering plan data. For each range of numbers in the database (280), this indicator will control the value of the indicator. Its possible values are "Odd", "Even", and "Unchanged". "Unchanged" denotes that the original software calculation (with F as a filler digit) will calculate the value.

VI. Operation and Examples

VI.A. Foreign Subscriber in North America

Figure 11:
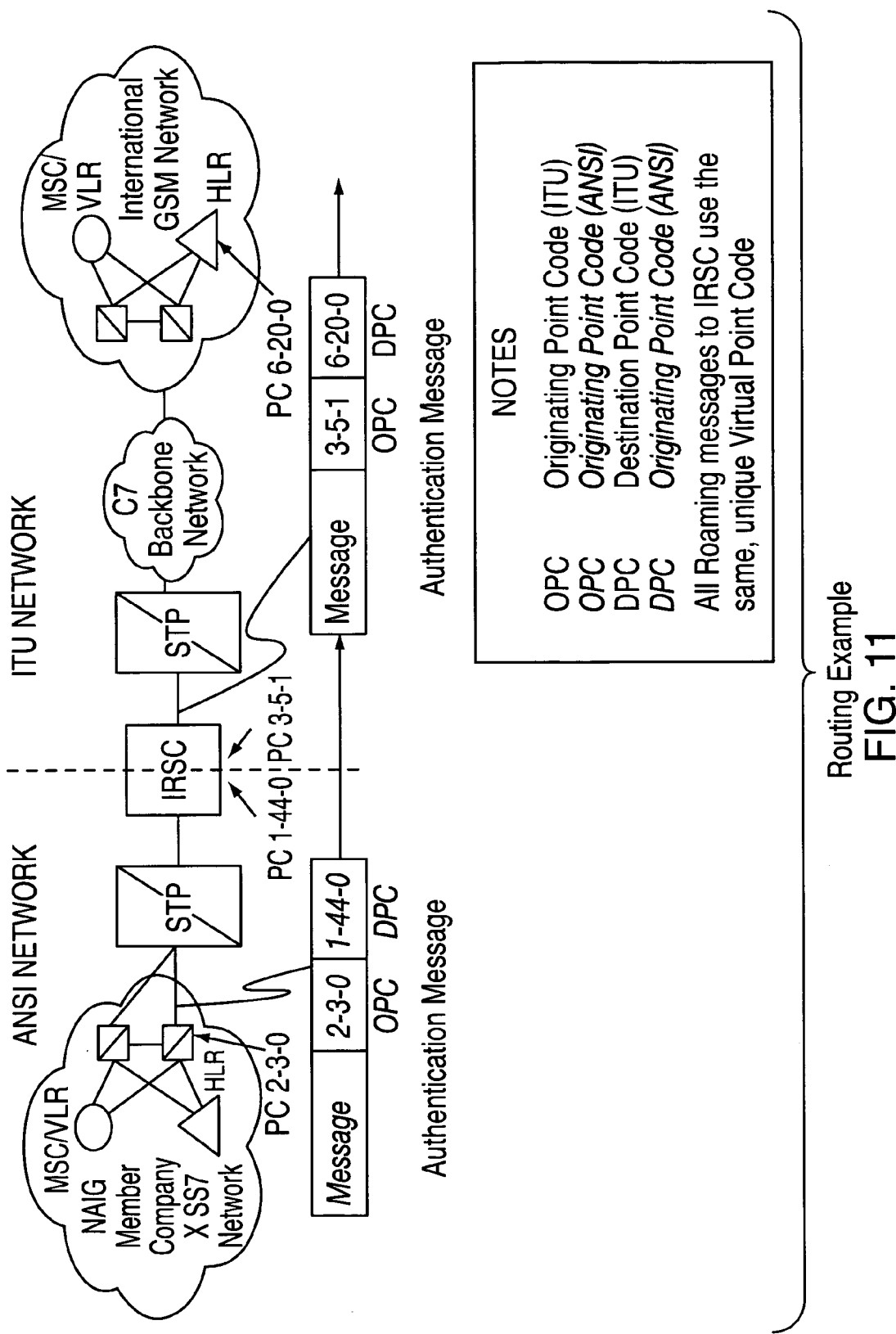
FIG. 11 is a schematic diagram of a routing example.

Consider an example, in which a European subscriber has roamed to New York, and that the example IRSC 100 is located in Montreal, Quebec, Canada. For purposes of this example, assume that the subscriber is a subscriber with France Telecom Mobile in Paris, France. The message flow is shown in FIG. 11.

As a first step, the European subscriber obtains a telephone handset that is compatible with North American type air interface. Many handsets are dual-use, and can be converted for North American use by means of a switch. In most cases, this is automatically accomplished by the handset. In other cases, the European subscriber may use his/her personalized SIM (Subscriber Information Module) card in a North American handset, thus giving the handset the subscriber's European IMSI identity code.

In this example, the phone's or SIM card's identification number allows the North American network to determine that the visitor is registered with France Telecom Mobile. As a result, in order to authorize the call and bill the subscriber, the ANSI network must obtain the subscriber's servicing and billing information from the subscriber's home location register (HLR) in Paris.

When an ITU subscriber turns on a handset in North America, and that handset has a SIM card with an ITU subscriber identity, the handset transmits an "authentication" message with the subscriber's identifying information over RF communication links to the closest mobile switching center in New York City in order to query the subscriber's HLR in Paris. This "authentication" message is transmitted with the E.212 numbering format When the MSC receives the "authentication" message, it stores the subscriber's identifying information in its visited location register and routes an "authentication and registration" message through the mobile network to IRSC 100. IRSC 100 serves as the intermediary to the ANSI network for all ITU networks and HLR's. The North American MSC knows to transmit the "authentication and registration" message to IRSC 100 by performing a Global Title Translation on the E.212 called party address. Normally, in an ITU network this would point to France Telecom's network, but in this case, it instead is set to point to that of the IRSC IRSC 100 executes software to convert the authentication message from ANSI format to ITU format, as discussed above in section II.E, and in sections VI.A.1 through VI.A.3

VI.A.1. SS7 Message Format Conversion

The protocol modification performed by IRSC 100 is the conversion of the MTP and SCCP layers of the message from ANSI SS7 format to ITU SS7 format. There are two versions of the SS7 protocol stack, one ANSI, and one ITU. Messages flow in on the ANSI stack, and are presented to the conversion software, which rebuilds the messages, and presents them to the selected stack, which then transmits them in the proper protocol, in this example, in ITU format. Higher layers, such as TCAP and MAP, may be passed transparently through without any translation or conversion.

IRSC 100 executes the translation of the variable values, (such as Called Party Address, Global Title Translation etc.) by using the processor 100 to access the database where it attempts to find a matching or partially matching entry to the received SCCP Called Party Address value in accordance with the Translation Type and numbering plan values also received, as used in the ANSI network. If this entry is not found, the message is rejected. If an entry is found, then the database is considered to be keyed at this line or "tuple". The remaining fields of this tuple determine the outgoing number plan, translation type, outgoing Called Party Address value and also the Global Title Translation result, which is the DPC, among other variables. The database values and indicators, in conjunction with the conversion algorithms, modify the message into the corresponding values used by the foreign network. Specifically, in the ANSI network, the "authentication and registration" message is routed using the Global Title Indicator and Translation Type values in the SCCP layer defined by the ANSI SS7 protocol.

ANSI Translation Type values specify the numbering format. The possible values are TT=9 for E.212, and TT=10 for E.164. These values define by nature the format and encoding schemes of the numbers (shown in FIG. 9). In contrast, the ITU network uses a single Translation Type of 0 but then further defines the Numbering Plan, Encoding Scheme, and Nature of Address Indicator as sub-parameters (shown in FIG. 8).

The foreign network sets the Translation Type value to zero and uses independent values for each numbering plan. FIGS. 8 and 9 show the formats and encoding of the Translation types used for GSM messages. These formats are used in the translation of the ANSI SCCP address formats and values into the ITU SCCP formats and values. Normally, IRSC 100 performs this conversion by equating the Translation Type (TT)=9 (E.212) to Type 0, the Numbering Plan=ITU E.214, Encoding Scheme=BCD Odd/Even, and Nature of Address Indicator=International, used in the ITU SS7 protocol. Note that the Odd/even value may be either computed, or alternatively, derived from the database depending on configuration. Similarly, for ITU to ANSI conversion, the processor 100 equates the Numbering Plan=ITU Recommendation E.214, Encoding Scheme=BCD Odd/Even, and Nature of Address Indicator=International, into the Translation Type=9. Normally, Translation Type 10 (E.164) is translated into ITU TT=0, Numbering Plan E.164 etc., and visa versa. However it is to be noted that since the process is database table driven, the translation method is flexible and need not necessarily perform the modification exactly as outlined in the example above.

VI.A.2. Address Translation

Prior to forwarding the authentication and registration message to the foreign subscriber's home location register, IRSC 100 must perform the translation of the IMSI global title address to the MGT global title address. As mentioned above, the type of addressing used in the ANSI network is International Mobile Station Identity (IMSI), as defined by ITU recommendation E.212, herein incorporated by reference. The type of addressing used in the foreign networks is Mobile Global Title (MGT), as defined in ITU Recommendation E.214, herein incorporated by reference.

The IRSC's process of translating the subscriber's global title address is shown in FIG. 7. The first step of the process is for IRSC 100 to receive the foreign subscriber's IMSI global title address 152, in the Called Party Address field of the message. Next, IRSC 100 keys the entry in the database.

IRSC 100 processes the translation of the foreign subscriber's IMSI global title address into their equivalent MGT global title address by keying the database of the IMSI global title address 92. In the keyed tuple, the outgoing Called Party Address field contains the equivalent components of the MGT global title address. Digits beyond those defined in the key are appended to the outgoing Called Party Address, as shown for example in FIG. 7.

receipt of a Called Party Address value of 216555411111111 (E.212 ANSI format) would key the entry 216555, and result in the outgoing value of 334614111111111 (in E.214 ITU format). The foregoing is an example of a roaming query message. Other messages, such as the response message, normally use E.164 numbering format. The database table is equipped to process incoming and outgoing E212, E.214, and E.164 numbering plans presently, but could handle other formats as well.

VI.A.3. Point Code Generation

The point code received by IRSC 100 (in the Destination Point Code [DPC] field) is the Virtual Point Code jointly assigned to IRSC 100's, in ANSI format, and essentially carries no information and has no purpose other than to deliver the message to IRSC 100 (see FIG. 11). However the outgoing message must identify the destination node in its own new DPC field. This is derived from performing a Global Title Translation (GTT) on the SCCP Called Party Address value. Once the database entry has been keyed, the International mobile service provider is identified, and his associated DPC (in ITU format) is defined, and copied into the DPC field of the MTP layer of the outgoing message. In the above example, this would result in a point code value of 2-255-2.

Once the point code, message format and address translations are completed, IRSC 100 forwards the converted message 162 back to the STP on an ITU link, which then transmits the "authentication and registration" message to the foreign subscriber's home network based on the DPC, or their global title address. Thus, IRSC 100 transmits a message compatible with the foreign network (i.e., DPC, and ITU/MGT) to deliver it to the foreign subscriber's home location register.

If the foreign subscriber's information is authentic, the foreign subscriber's home network registers the foreign subscriber's location for routing of incoming phone calls and SMS. In addition the foreign subscriber's servicing and billing information is downloaded to the visited location register of the MSC 14 that received the foreign subscriber's "send parameters message."

The services that can be downloaded from the foreign network to the ANSI network are previously agreed to in a bilateral agreement between the mobile service providers operating each network. As a result, the MSC 14 that received the foreign subscriber's "send parameters" message can service and bill the foreign subscriber, even though the foreign subscriber is registered in a foreign network. Services include the following: making and receiving calls; Receiving and sending Short Message Service messages, and most of the services that are available in his home network and have been covered under the visited mobile service provider's agreement.

If IRSC 100 and STP are unable to transmit the "authentication and registration" message directly to the foreign subscriber's home location register, the "authentication and registration" message is routed through the foreign network in a hierarchal and sequential manner using the, DPC, and possibly further Global Title Translations based on the foreign subscriber's MGT Called Party address.

VI.A.4. Processing of Network Management and Signaling Link of Maintenance Messages There is another process performed by IRSC 100, unrelated to the sending or receiving of roaming or SMS messages. IRSC 100 is interconnected to both ITU and ANSI networks, preferably via the STP's, using Virtual Point Codes. This configuration requires that from the STP's point of view, IRSC 100's are also STP type nodes, and must conform to certain network management and maintenance messages and behavior. In addition, IRSC 100's must also support linkset and link management and maintenance messages. However these messages are not mapped across the ITU/ANSI interface, but are instead processed only in the network concerned. In the case of a routeset becoming unavailable in one network, the other network is not advised. Furthermore if a message is attempted towards the unavailable route, it will be rejected with a failure message indicating route unavailability sent back on the originating network.

VI.B. A North American Subscriber Traveling Abroad

Further, IRSC 100 performs the conversions for a North American subscriber located in Europe. The necessary translations are essentially the converse of those translations performed for a European subscriber located in the United States (shown in FIG. 11). The ITU SS7 message format is translated into the ANSI SS7 message format. However, an intermediate step is normally required at the foreign MSC in the translation of the subscriber address. Once a European switch receives a signal from any subscriber, the switch must first convert the IMSI subscriber address, to an MGT address that is compatible with the ITU network. This conversion is necessary in order to route roaming messages through the European network, prior to receipt at IRSC 100, and is performed irrespective of the destination, and possible subsequent conversion to ANSI. Once these messages are received at IRSC 100, the message and address are converted back into ANSI, and translated to the IMSI format. And finally, an ANSI point code must be generated to enable the message to be delivered to the proper destination. These processes are described in greater detail in the paragraphs below.

IRSC 100 may also allow a North American subscriber to make and receive calls while traveling abroad, as well as SMS to roamers and non-roamers. The system works the same way as described above with reference to the foreign subscriber traveling in North America, with the operations performed in a similar manner. Instead of using the IMSI address to locate the IRSC, the foreign MSC creates an MGT address 220 from the E.212 transmitted by the ANSI subscriber's unit. As described above, once IRSC 100 receives the authentication and "send parameters" message from the foreign network, it performs the point code, SS7 and subscriber address processing.

IRSC 100 executes the translation by using the processor 100 to access the database where it attempts to find a matching or partially matching entry to the received SCCP Called Party Address value in accordance with the Translation Type and numbering plan values also received, as used in International network. If an entry is found, then the database is considered to be keyed at this line or "tuple". The remaining fields of this tuple determine the outgoing number plan, translation type, outgoing Called Party Address value and also the Global Title Translation result, among other variables. The database values and indicators, in conjunction with the conversion algorithms modify the message into the independent values used by the ANSI network.

VI.B.1. Address Translation

Prior to forwarding the authentication and registration message to the ANSI subscriber's home location register, IRSC 100 may perform the translation of the MGT Global Title (E.214) address to the IMSI (E.212) global title address. As mentioned above, the type of global title addressing used in the ANSI network is International Mobile Station Identity (IMSI), as defined by ITU recommendation E.212, herein incorporated by reference. The type of global title addressing used in the foreign networks is Mobile Global Title (MGT), as defined in ITU Recommendation E.214, herein incorporated by reference.

IRSC 100 processes the translation of the received MGT global title address by keying the database. In the keyed tuple, the outgoing Called Party Address field contains the equivalent components of the IMSI global title address. Digits beyond those defined in the key are appended verbatim to the outgoing Called Party Address.

VI.B.2. Point Code Generation

The point code received by IRSC 100 (in the Destination Point Code [DPC] field) is the Virtual Point Code jointly assigned to IRSC 100's, in ITU format, and essentially carries no information and has no purpose other than to deliver the message to IRSC 100. However the outgoing message must identify the destination node in its own new DPC field. This is derived from performing a Global Title Translation (GTT) on the SCCP Called Party Address value. Once the database entry has been keyed, the ANSI mobile service provider is identified, and his associated DPC (in ANSI format) is defined, and copied into the DPC field of the MTP layer of the outgoing message Once the point code, message format and address translations are completed, IRSC 100 forwards the converted message 162 back to the STP, which then transmits the "authentication and registration" message to the ANSI subscriber's home network based on the DPC, or their global title address. Thus, IRSC 100 transmits a message compatible with the ANSI network (i.e., DPC, and ANSI/IMSI format) to deliver it to the ANSI subscriber's home location register.

VI.C. Transparency

Preferably, IRSC 100 provides an interface between the ITU and ANSI networks that is transparent to network operators. This configuration locates IRSC 100 between an ITU STP and an ANSI STP, with a Virtual Point Code 290, 292 in each of the networks to provide redundancy. When an ITU mobile service provider requires to send a roaming message to another ITU mobile service provider, a Global Title Translation is performed on the Called Party Address MGT (or E.164) to derive the ITU Destination Point Code in the MTP of the message. The message is then routed through the SS7 signaling network to the destination. In this case, all North American destinations would result in a GTT to a single point code, that of the IRSC. Similarly, an ANSI mobile service provider would perform a GTT on the Called Party Address IMSI (or E.164) to derive an ANSI DPC. With IRSC 100 to provide the interworking, there is no modification to this method. The ITU mobile service provider, upon attempting to send a message to an ANSI mobile service provider, would perform the GTT, and derive the ITU virtual point code of IRSC 100, and then route the message to IRSC 100. In all respects, the routing and behavior of IRSC 100 as seen from the ITU mobile service provider's perspective is identical to that of any other ITU mobile service provider, or network. It is similar to the ANSI mobile service provider, who perceives IRSC 100 as any other ANSI mobile service provider.

VII. Alternative Embodiments

IRSC 100 has been described as an interconnection point between two networks. However, this invention can also serve as an interconnection point and interface between more than two disparate networks. Further, while IRSC 100 has been described as located at an ANSI/ITU STP facility, it could also be a located at other network elements, act as a stand-alone unit, or be located at foreign network elements.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A method, performed at an interface location between first and second networks, comprising, the steps of:

receiving an originating telephone transaction message from an originator on a first network, the originating message having a first network messaging protocol and requesting subscriber information from a home registration database located on a second network, the first and second networks using disparate messaging protocols suitable for the second network;

converting the first network messaging protocol of the originating message into a second network messaging protocol suitable for the second network;

forwarding the converted originating message to the home registration database of the second network;

receiving a responding message from the second network, the responding message having the second network messaging protocol;

converting the second network messaging protocol of the responding message into the first network messaging protocol; and forwarding the converted responding message to the originator, said method facilitating communications between a home register database and a computer operable on said second network, so that authorization commands can be issued directly from said home register database to said computer on said second network.

2. The method of claim 1, wherein said step of converting the first network messaging protocol further comprises a step of deriving a destination point code in the second network.

3. The method of claim 1, wherein said step of converting the second network messaging protocol further comprises a step of deriving a destination point code in the first network.

4. The method of claim 1, wherein said step of converting the first network messaging protocol further comprises a step of converting a format of an originator's address.

5. The method of claim 1, wherein said step of converting the second network messaging protocol further comprises a step of converting a format of an originator's address.

6. The method of claim 1, wherein said step of converting the first network messaging protocol further comprises a step of converting a format of a destination address.

7. The method of claim 1, wherein said step of converting the second network messaging protocol further comprises a step of converting a format of a destination address.

8. An apparatus, comprising:
a means for receiving an originating telephone transaction message from an originator on a first network, the originating message having a first network messaging protocol and requesting subscriber information from a home registration database located on a second network, the first and second networks using disparate messaging protocols;
a means for converting the first network messaging protocol of the originating message into a second network messaging protocol suitable for the second network;
a means for forwarding the converted originating message to the home registration database of the second network;
a means for receiving a responding message from the second network, the responding message having the second network messaging protocol suitable for the second network;
a means for converting the second network messaging protocol of the responding message into the first network messaging protocol; and
a means for forwarding the converted responding message to the originator on the first network, said means for converting employing a single entry to represent plural subscribers on said second network that have roamed to said first network.

9. The apparatus of claim 8, wherein said means for converting the first network messaging protocol further comprises a means for deriving a destination point code in the second network.

10. The apparatus of claim 8, wherein said means for converting the second network messaging protocol further comprises a means for deriving a destination point code in the first network.

11. The apparatus of claim 8, wherein said means for converting the first network messaging protocol further comprises a means for converting a format of an originator's address.

12. The apparatus of claim 8, wherein said means for converting the second network messaging protocol further comprises a means for converting a format of an originator's address.

13. The apparatus of claim 8, wherein said means for converting the first network messaging protocol further comprises a means for converting a format of a destination address.

14. The apparatus of claim 8, wherein said means for converting the second network messaging protocol further comprises a means for converting a format of a destination address.

15. An article comprising a system for conveying transactional messages over disparate networks, said system comprising:
a means for receiving an originating telephone transaction message from an originator on a first network, the originating message having a first network messaging protocol and requesting subscriber information from a home registration database located on a second network, the first and second networks using disparate messaging protocols;
a means for converting the first network messaging protocol of the originating message into a second network messaging protocol suitable for the second network suitable for the second network;
a means for forwarding the converted originating message to the home registration database of the second network;
a means for receiving a responding message from the second network, the responding message having the second network messaging protocol;
a means for converting the second network messaging protocol of the responding message into the first network messaging protocol; and
a means for forwarding the converted responding message to the originator on the first network, the means for converting operating in a separate computer system from a home registration database.

16. The article of claim 15, wherein said means for converting the first network messaging protocol further comprises a means for deriving a destination point code in the second network.

17. The article of claim 15, wherein said means for converting the second network messaging protocol further comprises a means for deriving a destination point code in the first network.

18. The article of claim 15, wherein said means for converting the first network messaging protocol further comprises a means for converting a format of an originator's address.

19. The article of claim 15, wherein said means for converting the second network messaging protocol further comprises a means for converting a format of an originator's address.

20. The article of claim 15, wherein said means for converting the first network messaging protocol further comprises a means for converting a format of a destination address.

21. The article of claim 15, wherein said means for converting the second network messaging protocol further comprises a means for converting a format of a destination address.

* * * * *

UNITED STATES PATENT AND TRADEMARK OFFICE
CERTIFICATE OF CORRECTION

PATENT NO. : 7,649,908 B2  Page 1 of 1
APPLICATION NO. : 10/749003
DATED : January 19, 2010
INVENTOR(S) : Thomas Schwalb It is certified that error appears in the above-identified patent and that said Letters Patent is hereby corrected as shown below:

Column 16, lines 29 - 55, claim 1 should read:

1. A method, performed at an interface location between first and second networks, comprising, the steps of:

receiving an originating telephone transaction message from an originator on a first network, the originating message having a first network messaging protocol and requesting subscriber information from a home registration database located on a second network, the first and second networks using disparate messaging protocols;

converting the first network messaging protocol of the originating message into a second network messaging protocol suitable for the second network;

forwarding the converted originating message to the home registration database of the second network;

receiving a responding message from the second network, the responding message having the second network messaging protocol;

converting the second network messaging protocol of the responding message into the first network messaging protocol; and forwarding the converted responding message to the originator, said method facilitating communications between a home register database and a computer operable on said second network, so that authorization commands can be issued directly from said home register database to said computer on said second network.

Signed and Sealed this

Twentieth Day of April, 2010

David J. Kappos
*Director of the United States Patent and Trademark Office*